United States Patent
Li et al.

(10) Patent No.: US 12,489,729 B2
(45) Date of Patent: Dec. 2, 2025

(54) PROFILE-BASED ROUTING AND ACCESS CONTROL FOR MANAGEMENT INTERFACE OF VIRTUAL NETWORK SERVICES

(71) Applicant: Verizon Patent and Licensing Inc., Basking Ridge, NJ (US)

(72) Inventors: Minbao Li, Lewisville, TX (US); Samir Ariwala, Mckinney, TX (US); Tahir H. Khan, Aldie, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 206 days.

(21) Appl. No.: 17/936,152

(22) Filed: Sep. 28, 2022

(65) Prior Publication Data

US 2024/0106799 A1 Mar. 28, 2024

(51) Int. Cl.
*H04L 9/40* (2022.01)

(52) U.S. Cl.
CPC ........ *H04L 63/0236* (2013.01); *H04L 63/102* (2013.01); *H04L 63/105* (2013.01)

(58) Field of Classification Search
None
See application file for complete search history.

(56) References Cited

U.S. PATENT DOCUMENTS

| | | | |
|---|---|---|---|
| 10,348,767 B1* | 7/2019 | Lee | H04L 63/0236 |
| 2003/0005116 A1* | 1/2003 | Chase | H04L 67/1014 709/225 |
| 2005/0267970 A1* | 12/2005 | Sugizaki | H04L 67/04 709/225 |
| 2010/0299406 A1* | 11/2010 | Murata | H04L 67/01 709/219 |
| 2014/0130136 A1* | 5/2014 | Chaplik | H04L 63/0815 726/4 |
| 2016/0226849 A1* | 8/2016 | Fan | H04L 9/32 |
| 2017/0366634 A1* | 12/2017 | Bonnet | H04W 48/17 |
| 2019/0356648 A1* | 11/2019 | Feng | H04L 63/0869 |
| 2021/0029074 A1* | 1/2021 | Buck | H04L 63/0236 |

* cited by examiner

*Primary Examiner* — Raqiul A Choudhury

(57) ABSTRACT

Systems and methods described herein provide profile-based routing and access control for a management interface of virtual network services with multiple tenants. A network device receives a request from a user device to access a webpage for an assisted network management service, and obtains, in response to the request, a user profile associated with a user of the user device. The network device retrieves an Internet Protocol (IP) address for a customer web server, of multiple customer web servers for the assisted network management service, that corresponds to the user profile. The network device generates, based on the IP address, a routing rule to route the request to the customer web server.

20 Claims, 7 Drawing Sheets

PROFILE-BASED ROUTING AND ACCESS CONTROL FOR MANAGEMENT INTERFACE OF VIRTUAL NETWORK SERVICES

BACKGROUND

Service providers are deploying private networks utilizing configurable cloud-based wide area network (WAN) services. These private networks, also referred to as enterprise networks, may be complex and have multiple locations and/or data centers. Multi-Access Edge Computing (MEC) services may also be used to provide services inside and outside of the private network. Service providers can provide customers with self-service management (e.g., configuration changes, policy changes, etc.) of network functions and networks for their enterprise and/or MEC deployments.

DETAILED DESCRIPTION OF EXAMPLE EMBODIMENTS

The following detailed description refers to the accompanying drawings. The same reference numbers in different drawings may identify the same or similar elements.

Enterprise network customers can benefit from an assisted network management service, which allows customers to make their own network changes assisted by an intelligent backend. In some cases, it may be desirable to have some assisted network management services accessible via the Internet (e.g., a public network) to allow for convenient customers access. However, assisted network management services must be secure and are typically restricted to intranet access to prevent potential hacking activities from the Internet.

Systems and methods described herein permit access, via a public network, to a customer's interface for an assisted network management service. More particularly, the system and methods combine customer access control (e.g., authentication and authorization) with reverse proxy (RP) and/or load balancer (LB) features to provide dynamic customer profile-based routing.

According to an implementation, profile-based routing and access control are provided for a management interface of virtual network services with multiple tenants. A network device may receive a request from a user device to access a webpage for an assisted network management service and may obtain, in response to the request, a user profile associated with a user of the user device. The network device may retrieve an Internet Protocol (IP) address for a customer web server, of multiple customer web servers for the assisted network management service, that corresponds to the user profile. The network device may generate, based on the dynamically obtained IP address, a routing rule to route the request to the customer web server.

As used herein, the terms "user" and "customer" may be used interchangeably. Also, the terms "user" and "customer" are intended to be broadly interpreted to include a user device or a user of a user device.

Figure 1:
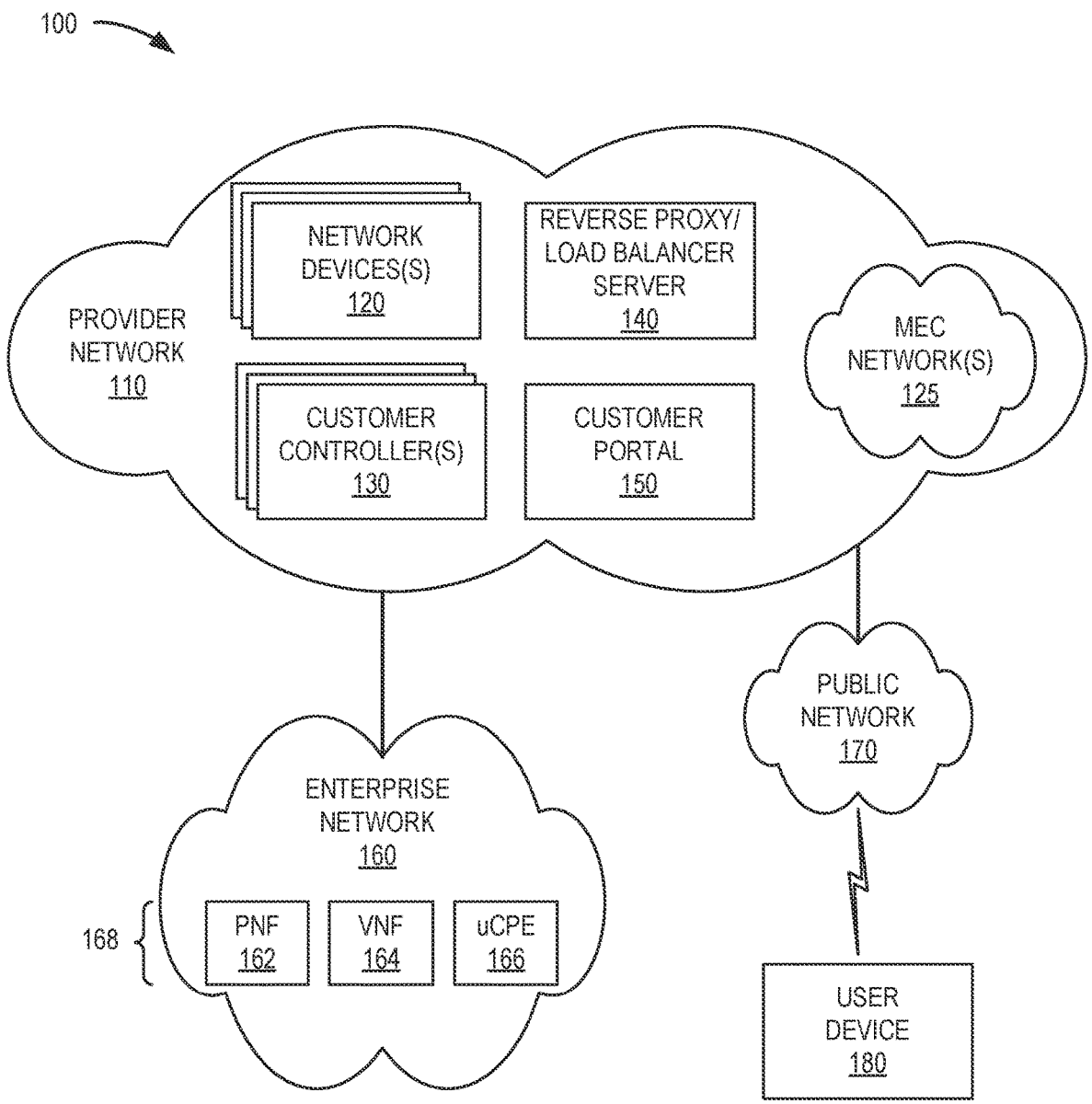
FIG. 1 is a diagram illustrating a network environment, according to an implementation described herein.

FIG. 1 is a diagram of an exemplary environment 100 in which the systems and/or methods, described herein, may be implemented. As shown in FIG. 1, environment 100 may include a provider network 110, an enterprise network 160, a public network 170, and user devices 180. According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communication connection via a link may be direct or indirect. For example, an indirect communication connection may involve an intermediary device and/or an intermediary network not illustrated in FIG. 1. Additionally, the number and the arrangement of links illustrated in environment 100 are exemplary.

Provider network 110 may generally include one or more wired, wireless and/or optical networks that are capable of receiving and transmitting data, voice and/or video signals. For example, provider network 110 may include one or more access networks, IP multimedia subsystem (IMS) networks, core networks, or other networks. The access network may include a wireless communications network that connects users/customers (e.g., using user device 180) to other portions of provider network 110 (e.g., the core network). In one example, the access network may include a Fifth Generation (5G) access network and/or a long-term evolution (LTE) access network. Provider network 110 may further include one or more satellite networks, one or more packet switched networks, such as an IP-based network, a local area network (LAN), a wide area network (WAN), a personal area network (PAN) (e.g., a wireless PAN), a wireless local area network (WLAN), an intranet, or another type of network that is capable of transmitting data. As descried further herein, provider network 110 may also include one or more Multi-access Edge Computing (MEC) networks (e.g., MEC network 125) associated with a core network or the access network controlled by the core network. In an exemplary implementation, provider network 110 may represent a network associated with a service provider that provides various services, such as IP-related services, value added services, etc. According to an implementation, provider network may provide services to enterprise network 160.

In the example of FIG. 1, provider network 110 may include network devices 120. Each network device 120 may be configured to perform network functions in provider network 110. For example, network device 120 may include a switch, a router, a firewall, a gateway, a Network Address Translation (NAT) device, a Reconfigurable Optical Add-Drop Multiplexer (ROADM), and/or another type of network device. Some or all of the functionality of network device 120 may be virtualized as a Virtual Network Function (VNF) in provider network 110. Depending on the implementation, network 110 may include other types of network devices 120, such as, for example, a base station (e.g., a next-generation NodeB, an evolved NodeB, etc.), a gateway device, a support node, a serving node, a core access and mobility management function (AMF), a session management function (SMF), a policy control function (PCF), as well as other network devices that provide various network-related functions and/or services, such as charging and billing, security, authentication and authorization, network policy enforcement, management of subscriber profiles, and/or other functions and/or services that facilitate the operation of the core network. Network devices 120 may receive, store, and enforce policies for end devices in enterprise network 160 (e.g., network function (NF) instances 168, described below) and other user devices (e.g., user device 180).

According to implementations describe herein, provider network 110 may also include MEC network 125, customer controllers 130, a reverse proxy/load balancing (RP/LB) server 140, and a customer portal 150. MEC network 125, customer controllers 130, context service framework 140, and customer portal 150 may include network devices to implement an assisted network management service for enterprise network 160 and are described further below.

MEC network 125 may include one or more configurable devices to provide MEC services to enterprise network 160 and/or user devices 180. A MEC service may include, for example, a low-latency microservice associated with a particular application, such as, for example, a user authentication microservice, a navigation microservice, an online shopping microservice, data compression, a content delivery microservice, a gaming microservice, a virtual and/or augmented reality microservice, a health monitoring microservice, and/or another type of microservice associated with a low latency requirement. As another example, a MEC microservice may include a microservice associated with a VNF of provider network 110.

Customer controllers 130 may provide access to self-service capabilities for an assisted network management service to enable customers (e.g., network administrators for enterprise network 160) to make changes to enterprise network 160. Customer controller 130 may function as an application server or web server to provide a customer-specific management interface for the assisted network management service. Each customer controller 130 may be implemented, for example, as a Virtual Network Function (VNF) virtual machine (VM) or another software defined networking (SDN) component. Customer controllers 130 may provide a structured user interface configured to permit a certain level of access to enterprise network 160 based on, for example, a user profile. Via user device 180, users (e.g., enterprise customers) may provide requests to a customer controller 130 to manage (e.g., introduce, configure, issue commands, update, monitor, etc.) configurations/policies associated with enterprise network 160. For example, using customer controller 130, customers may manage their SDN device configurations for selected eligible parameters and make changes into SDN device instances 168 by changing the configuration that is managed by the service provider of provider network 110. According to an implementation, customer controllers 130 may be assigned to provide services for individual enterprise networks 160 and users from one enterprise network 160 cannot access a customer controller 130 for another enterprise network 160. Furthermore, there may be different customer controllers 130 to provide different services and/or redundancy for the same customer/enterprise network 160. According to an implementation, each customer controller 130 may have a unique IP address.

RP/LB server 140 may include a network device that incorporates a combination of reverse proxy and load balancing services. As a reverse proxy, RP/LB server 140 provides protection to one or more customer controllers 130 by receiving requests from customers (e.g., user devices 180) on behalf of customer controllers 130. User devices 180 send requests to the address (e.g., a common URL) of the RP/LB server 140, which in turn replaces the address of RP/LB server 140 with the address of an authorized customer controller 130 and relays the request to the corresponding customer controller 130. As such, individual addresses of the customer controllers 130 are not publicly known.

As a load balancer, RP/LB server 140 may load balance traffic for the assisted network management service across multiple instances of a particular network function(s) based on the determined traffic load and resource availability. For example, RP/LB server 140 may load balance messages among multiple customer controllers 130. RP/LB server 140 may redirect calls from user devices 180 to various customer controllers 130, allowing provider network 110 to manage workloads and scale clusters. As described further herein, RP/LB server 140 provides dynamic customer-profile-based routing.

Customer portal 150 may include network devices that provide a web-based interface for a customer (e.g., using user device 180) to be authenticated on provider network 110. According to an implementation, customer portal 150 may provide federated authentication, where a customer that attempts to access a service through RP/LB server 140 (e.g., to access the assisted network management service of customer controller 130) is redirected to customer portal 150. Customer portal 150 may authenticate the customer and provide a session cookie to the customer.

Enterprise network 160 (also referred to herein as a "customer network") may include a network that receives services from provider network 110. Enterprise network 160 may include a local area network (LAN), a WAN, or a combination of networks that provide network access to devices in provider network 110. In one implementation, enterprise network 160 may include a network interconnecting one or more physical network functions (PNF) 162, virtual network functions (VNF) 164 or cloud network functions (CNF), and/or universal customer premises equipment (uCPE) 166 (referred to collectively herein as "NF instances 168" or "NFs 168"). NF instances 168 may be provided by different suppliers/vendors for a service provider and may be configured using vendor-specific APIs. In another implementation, enterprise network 160 may include application servers for user devices 180 (e.g., machine-type communication (MTC) devices, mobile devices, etc.). The application servers may, for example, receive and process data from user devices 180. In another implementation, enterprise network 160 may include gateway (GW) routers (e.g., customer premises equipment) that act as a secure gateway for devices within enterprise network 160. In still another implementation, enterprise network 160 may utilize deployed network functions in MEC network 125. According to implementations described herein, authorized users may manage aspects of enterprise network 160 via a management interface provided via customer controllers 130.

Public network 170 may include a WAN, an intranet, a telephone network (e.g., the Public Switched Telephone Network), or a combination of networks. Public network 170 may include, for example, an untrusted network, such as the Internet. Public network 150 may further include transport and/or network devices such as routers, switches, and/or firewalls. According to an implementation, a customer (e.g., using user device 180) may access services of provider network 110 via public network 170.

User device 180 may include a computational or communication device that is capable of communicating with provider network 110. In one aspect, user device 180 may be used by a customer (e.g., a network administrator) to communicate with network devices 120, customer controllers 130, RP/LB server 140, and/or customer portal 150. User device 180 may include, for example, a personal communications system (PCS) terminal (e.g., a smartphone that may combine a cellular radiotelephone with data processing and data communications capabilities), a tablet computer, a personal computer, a laptop computer, an Internet television, or other types of computation or communication devices. User device 180 may include a client-side application or web browser to access a management interface via customer controllers 130.

According to implementations described herein, customer access control (e.g., authentication/authorization) for assisted network management services may include profile-based routing. Using user devices 180, customers may access their administrative interface through a common uniform resource locator (URL) or link (e.g., "providername.com/serviceadmin") that services multiple customers. No customer-specific URL is used, which prevents guessing or manipulating of URLs by unauthorized customers. When the request comes to RP/LB server 140, RP/LB server 140 will first authenticate the user based on user credentials, retrieve a corresponding user profile, and authorize the user based on access levels indicated in the user profile.

Figure 2A:
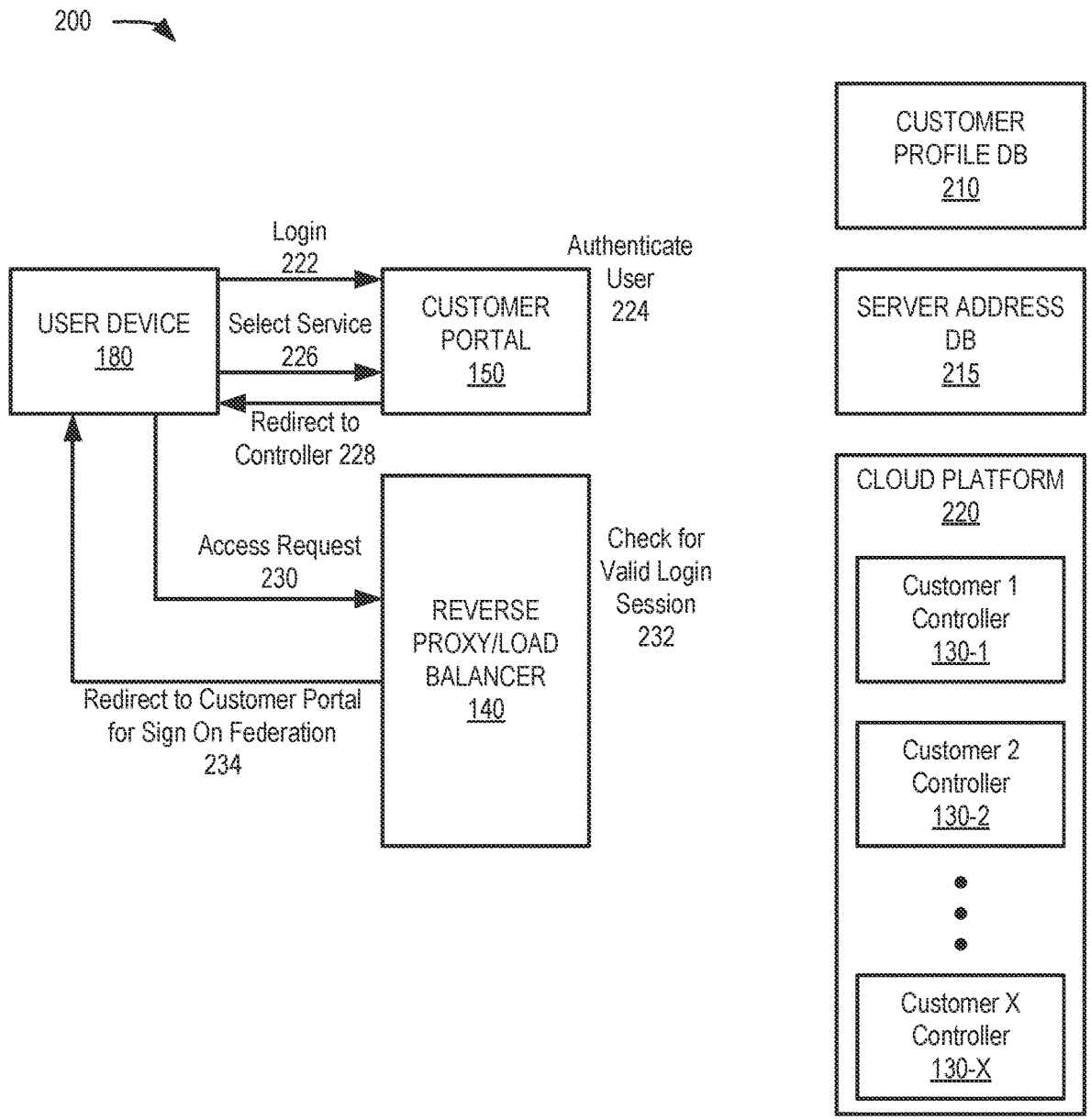
FIGS. 2A-2C are diagrams illustrating an example configuration and communications to implement dynamic profile-based routing and access control, according to an implementation described herein.
Figure 2B:
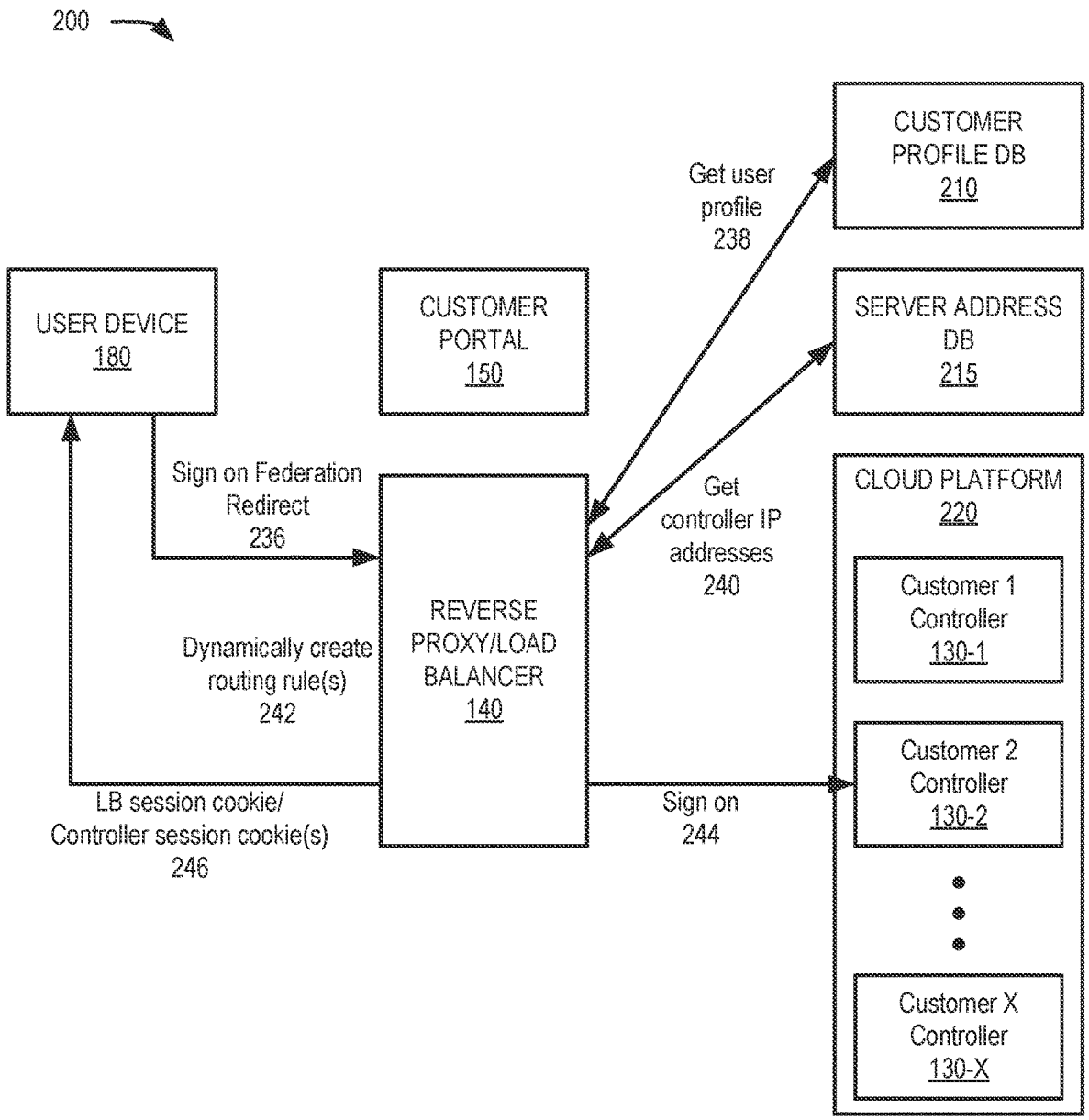
Figure 2C:
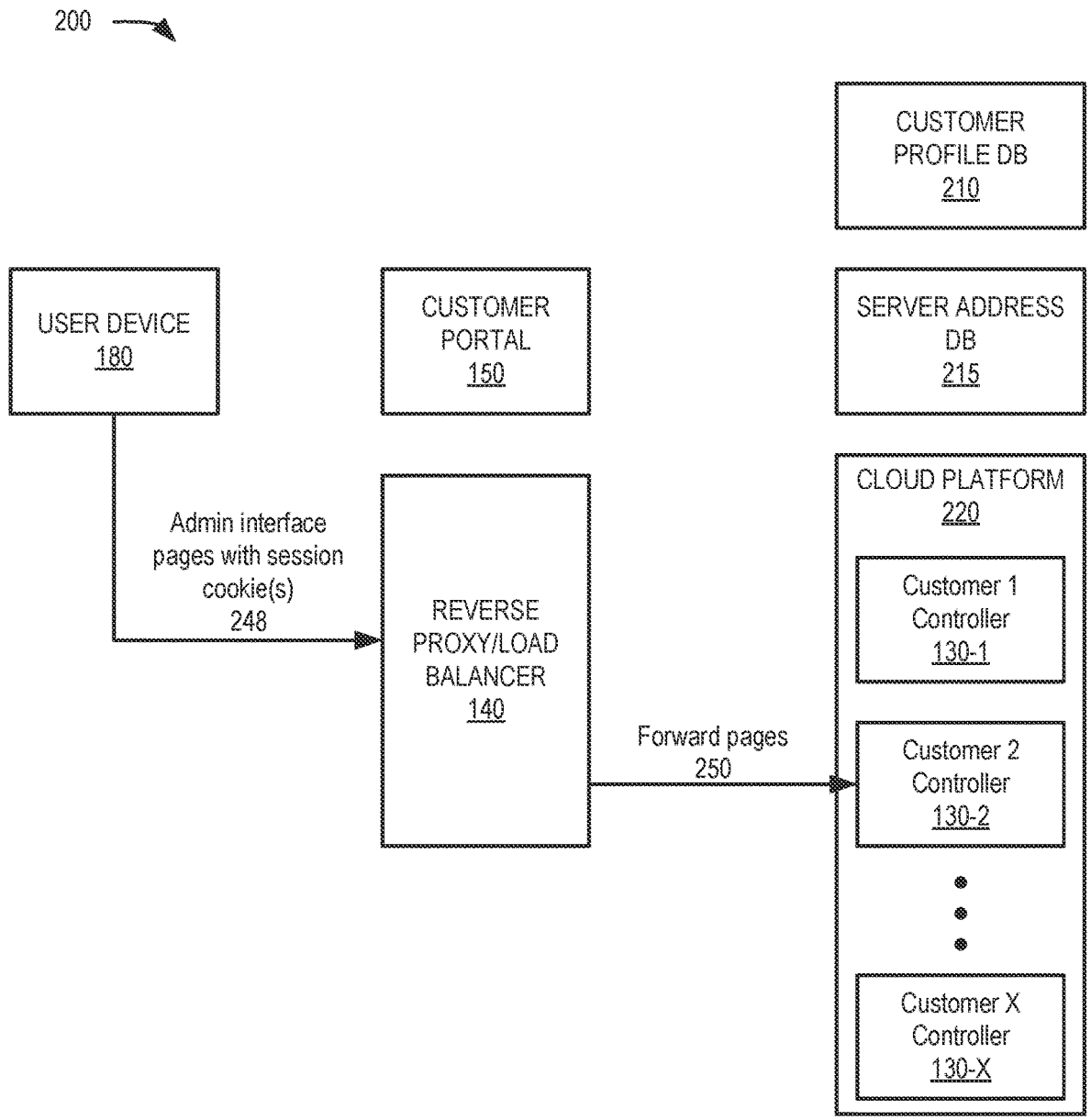

FIGS. 2A-2C are diagrams illustrating an example configuration and communications to implement dynamic profile-based routing and access control in a portion 200 of network environment 100. As shown in FIGS. 2A-2C, network portion 200 may include RP/LB server 140, customer portal 150, user device 180, a customer profile database (DB) 210, a server address database 215, and a cloud platform 220.

Cloud platform 220 may include network devices, computing devices, and other equipment to provide services, including assisted network management services for customers with user devices 180. For example, cloud platform may host different application and/or enterprise services used by end devices 180. Cloud platform 220 may include a private cloud platform or Virtual Private Cloud (VPC) of a public cloud platform. Examples of different types of cloud platform providers may include Amazon® Web Services (AWS), Microsoft Azure®, IBM IOT Bluemix®, etc. Using cloud platform 220, a service provider may provide a management interface for multiple tenants (e.g., enterprise customers) of virtual network services. As shown in FIG. 2A-2C, cloud platform 220 may include multiple customer controllers 130-1 through 130-X (referred to collectively as "customer controllers 130" and generically as "customer controller 130"). Assuming a high availability requirement for the assisted network management service, customer controllers 130 may be deployed on multiple virtual machines (VMs) to support failover.

Customer profile database 210 may include a database of user profiles associated with each customer. Each user profile may include, among other information, an access control class, server types (e.g., corresponding to customer controllers 130), and/or a list of services to which a customer is authorized (collectively referred to as an "access level"). For example, different users (e.g., network administrators) for enterprise network 160 may be assigned different access levels or authorized to access different network management services. User profiles for customer profile database 210 may be provisioned, for example, during configuration of the assisted network management service for enterprise network 160 in accordance with the enterprise customer directives.

Server address database 215 may include a database of network addresses (e.g., IP addresses) of different customer controllers 130. Server address database 215 may include data to associate IP addresses of customer controllers 130 with corresponding users and access levels from the user profiles. According to an implementation, server address database 215 may be separate from user profile database 210, or a data source that does not include the stored user profiles.

FIGS. 2A-2C provide simplified illustrations of communications in network portion 200 and is not intended to reflect every signal or communication exchanged between devices/functions. Referring to FIG. 2A, a customer may use a user device 180 and a link (e.g., "providername.com") to access customer portal 150 and provide login information 222 (e.g., credentials such as username, password, etc.). Customer portal 150 may receive login information 222 and authenticate 224 the customer, assuming the login information and other user data (e.g., two-factor authentication, etc.) is valid. The authenticated customer may then provide user input to select a service 226. For example, after authentication, the customer may select an option for assisted network management services from a webpage or app presented by customer portal 150. In response to the customer selection, customer portal 150 may provide a common link (e.g., "providername.com/serviceadmin") to redirect 228 user device 180 to a webpage for the controller services.

Using the link from redirect 228, user device 180 may submit an access request 230 that is received by RP/LB server 140. RP/LB server 140 may check 232 if the customer has a valid session with RP/LB server 140. Assuming there is a current session, RP/LB server 140 may provide a link (e.g., "providername.com/idp") to redirect 234 user device 180 to customer portal 150 for federation authentication. Using known techniques, user device 180 and customer portal 150 may perform a federation authentication process (not shown), where customer portal 150 serves as the identity provider (IdP).

Referring to FIG. 2B, upon successful federated authentication, user device 180 may receive a link (e.g., "providername.com/controllersignon") that automatically redirects 236 the customer to RP/LB server 140. RP/LB server 140 may receive redirect 236 and, in response, retrieve a user profile from the login session. For example, RP/LB server 140 may retrieve 238 a user profile from customer profile database 210. The user profile may identify, for example, an access level or particular services to which the user is subscribed/authorized.

With the user profile retrieved, RP/LB server 140 may access server address database 215 to retrieve 240 IP addresses of all servers (e.g., customer controllers 130) the customer is authorized to access. Using the retrieved IP addresses, RP/LB server 140 may then dynamically generate 242 a routing rule for the session with user device 180. The routing rule may allow RP/LB server 140 to route the user request (e.g., access request 230) to one of the retrieved customer IP addresses based on a status of customer controllers 130 and load balance configuration (e.g., active/ passive). RP/LB server 140 may select one of the authorized and available customer controllers 130 (e.g., customer controller 130-2).

Since RP/LB server 140 handles the user login and authorization of the user's access to the customer controller 130, RP/LB server 140 can also support silent sign on (or single sign on) to customer controller 130 along with the other reverse proxy and load balancing features described herein. RP/LB server 140 may perform a server side silent sign on 244 to the selected customer controller (e.g., customer controller 130-2). As part of the sign on process, RP/LB server 140 may issue to user device 180 a LB session cookie and a separate controller session cookie.

According to one implementation, the dynamically retrieved customer IP addresses may be cached at RP/LB server 140 for future use to improve routing performance and scalability. According to another implementation, the dynamically retrieved customer IP addresses may be cached with a client at user device 180 (e.g., similar to the encrypted controller session cookie to avoid being manipulated). With a successful sign on, RP/LB server 140 may then provide 246 the LB session cookie, the controller session cookie, and/or the encrypted IP address for the customer controller (e.g., customer controller 130-2) to user device 180.

Referring to FIG. 2C, after successful sign on, a customer may use user device 180 to navigate an administrative interface for the assisted network management service. User device 180 may provide web page inputs 248 to RP/LB server 140 using a common link (e.g., "providername.com/admin"). The web page inputs may include, for example, the LB session cookie and the controller session cookie. In some implementations, the web page inputs may also include the encrypted IP address for the customer controller 130-2. RP/LB server 140 may receive web page inputs 248 and, in response, retrieve the user profile based on the LB session cookie. RP/LB server 140 may find customer controller IP address for customer controller 130-2 (e.g., from a local cache, the encrypted IP address provided by the user device, or database 215). Using the customer controller IP address, RP/LB server 140 may then forward 250 the admin interface pages (e.g., web pages, application interfaces, etc.). For example, RP/LB server 140 may reverse proxy the controller pages with the controller session cookie forwarded to customer controller 130-2.

According to implementations described above, there is no need to have a direct network connection between customer portal 150 and RP/LB server 140, since sign on federation can be done through the browser redirect. Furthermore, there is no need to have a direct network connection between customer portal 150 and customer controllers 130. RP/LB server 140 may sit in any network that can both access cloud platform 220 and be accessed from the Internet or public network 170. For example, RP/LB server 140 could be deployed within controller cloud platform 220 if the cloud platform can be accessed from the Internet. In one implementation, RP/LB server 140 may be deployed in the same security group as customer controllers 130.

Although FIGS. 2A-2C illustrate certain components and communications for the assisted network management service, in other implementations, the assisted network management service may include fewer, different, or additional components than depicted in FIGS. 2A-2C. Additionally, or alternatively, one or more components of the assisted network management service may perform functions described as being performed by one or more other components.

Figure 3:
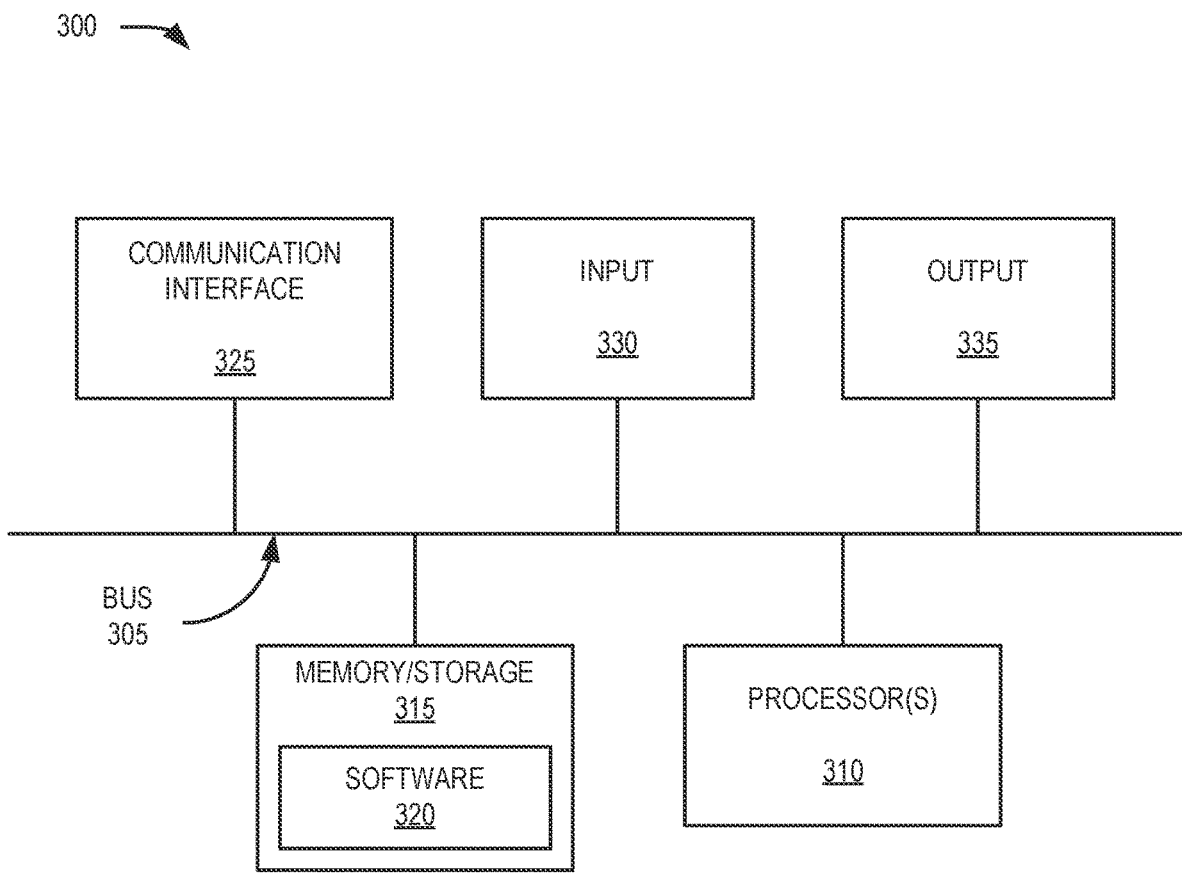
FIG. 3 is a diagram illustrating example components of a device that may correspond to one or more of the devices illustrated and described herein.

FIG. 3 is a diagram illustrating exemplary components of a device 300 that may correspond to one or more of the devices described herein. For example, device 300 may correspond to components included in network device 120, customer controller 130, SDN device instance 138, RP/LB server 140, customer portal 150, devices in enterprise network 160, and user device 180. As illustrated in FIG. 3, according to an exemplary embodiment, device 300 includes a bus 305, processor 310, memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operations performed by device 300. Processor 310 may perform operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium.

Memory/storage 315 may include a drive for reading from and writing to the storage medium. Memory/storage 315 may be external to and/or removable from device 300, such as, for example, a Universal Serial Bus (USB) memory stick, a dongle, a hard disk, mass storage, off-line storage, network attached storage (NAS), or some other type of storage medium (e.g., a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. For example, according to an implementation, software 320 may implement portions of the assisted network management service on customer controller 130, RP/LB server 140, customer portal 150, and user device 180.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 in a computer-readable medium, such as memory/storage 315. A computer-readable medium may be defined as a non-transitory memory device. A memory device may be implemented within a single physical memory device or spread across multiple physical memory devices. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
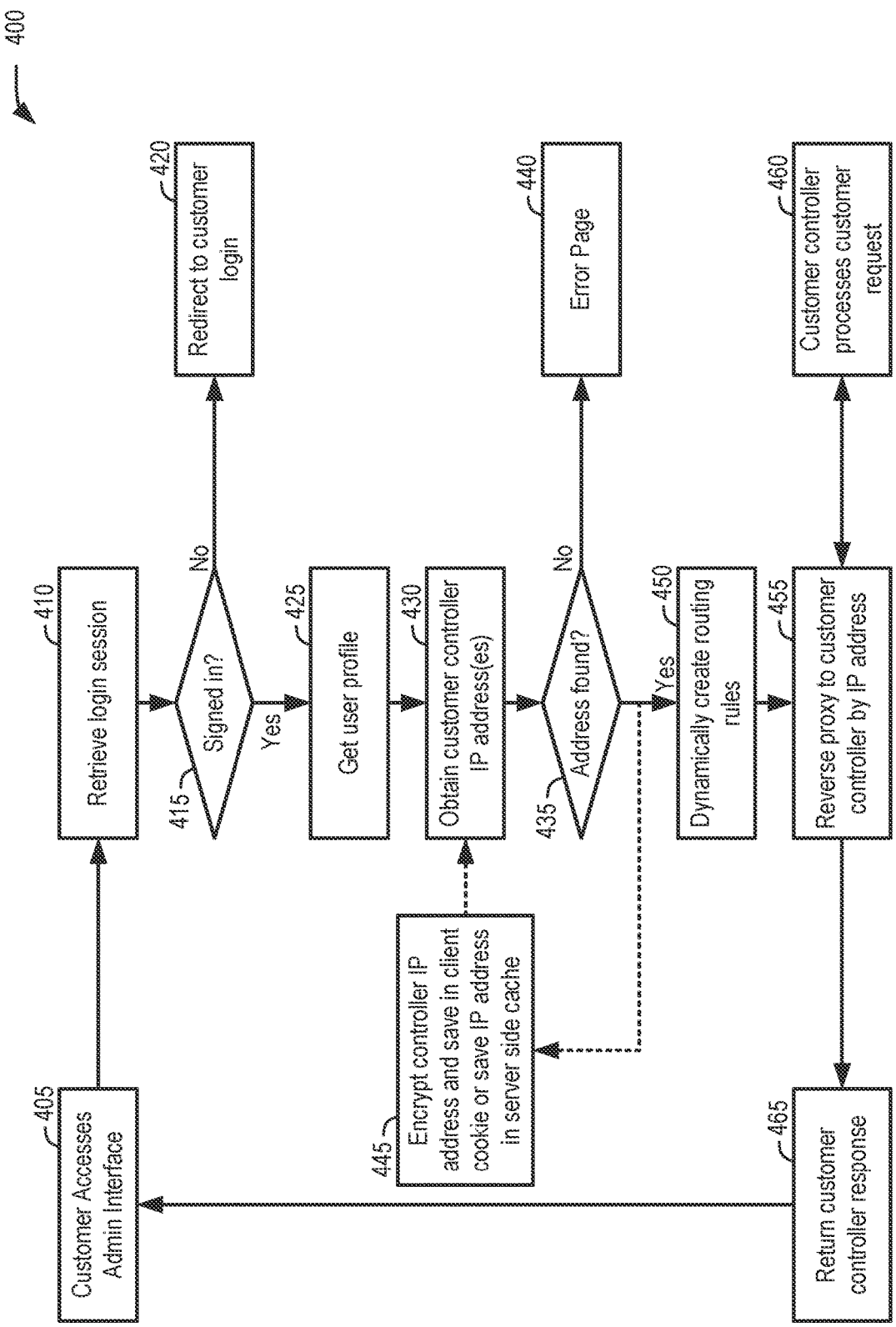
FIG. 4 is a flow diagram illustrating a process for conducting profile-based routing and access control, according to an implementation.

FIG. 4 is a flow diagram illustrating a process 400 to implement profile-based routing and access control. In one implementation, process 400 may be implemented by RP/LB server 140. In another implementation, process 400 may be implemented by RP/LB server 140 in conjunction with one or more other devices in network portion 200. Process 400 may correspond, for example, to communications 248 and 250 of FIG. 2C.

Process 400 may include a customer accessing an administrative interface for the assisted network management service (block 405). For example, a customer using user device 180 may attempt to access through public network 170 (e.g., the Internet) the administrative interface of the assisted network management service provided by a service provider. For example, a customer may use a non-customer-specific URL (e.g., "providername.com/admin" or "enterprise.providername.com/admin") to access the assisted network management service for a particular enterprise network 160. In contrast with standard load balancer requirement, no user specific URL is used. Instead, the customer's user device 180 may provide a login session cookie (e.g., the LB session cookie if previously obtained through the sign on federation described in connection with FIGS. 2A and 2B).

Process 400 may further include retrieving a login session (block 410) and determining if the customer has already signed in (block 415). For example, when the request from user device 180 comes to RP/LB server 140, RP/LB server 140 may first verify whether the customer is already signed in by checking (e.g., decrypting) whether a valid login session cookie was sent in the request.

If the customer has not already signed in (block 415—No), process 400 may include redirecting the user device to a customer login page (block 420). For example, if no valid login session is found, the customer will be redirected to a login page (e.g., using a link associated with customer portal 150). If the customer has already signed in (block 415—Yes), process 400 may include obtaining a user profile (block 425). For example, if a valid login session is found, RP/LB server 140 may retrieve a user profile from the login session.

Process 400 may also include obtaining one or more IP addresses for the customer controllers (block 430) and determining if an address are present (block 435). For example, with the user profile retrieved, the RP/LB server 140 may access a database (e.g., server address DB 215) to retrieve IP addresses of all servers (e.g., customer controllers 130) the customer is authorized to access. Alternatively, RP/LB server 140 may retrieve the IP addresses from a local cache (e.g., if previously obtained, as described below). In still another implementation, RP/LB server 140 may retrieve the IP addresses from an encrypted cookie provided by user device 180 in the access request.

If no IP address for the customer controllers is present (block 435—No), process 400 may include providing an error page (block 440). For example, RP/LB server 140 may redirect user device 180 to an error page using a standard URL. If at least one IP address for the customer controllers are present (block 435—Yes), process 400 may include optionally encrypting the controller IP address for a client cookie or saving the IP address in a server-side cache (block 445). For example, optionally, dynamically retrieved controller IP addresses could be cached on the server side or client side for future uses to improve routing performance and scalability. Client-side customer specific IP addresses may be encrypted to avoid being manipulated.

Process 400 may also include dynamically creating routing rules for the customer (block 450). For example, RP/LB server 140 may then dynamically generate the routing rule(s) to be used by RP/LB server 140 for the LB session. For example, RP/LB server 140 may generate routing rules to which packet parameters from user device 180 can be matched. The routing rules may associate the controller IP addresses with different request types from user device 180, for example.

Process 400 may additionally include conducting reverse proxy to the customer controller by the IP address (block 455) and processing the customer request (block 460). For example, once RP/LB server 140 retrieves the IP addresses for the customer and creates the routing rules based on the dynamically retrieved IP addresses, RP/LB server 140 may route a user request to one of the retrieved IP addresses based on, for example, server (e.g., customer controller 130) status and load balance configuration (typically active/passive).

Process 400 may further include returning a customer controller response to the customer (block 465). For example, after the applicable customer controller 130 responds to RP/LB server 140, RP/LB server 140 may forward the response (e.g., after processing the response) to the client browser of user device 180.

Figure 5:
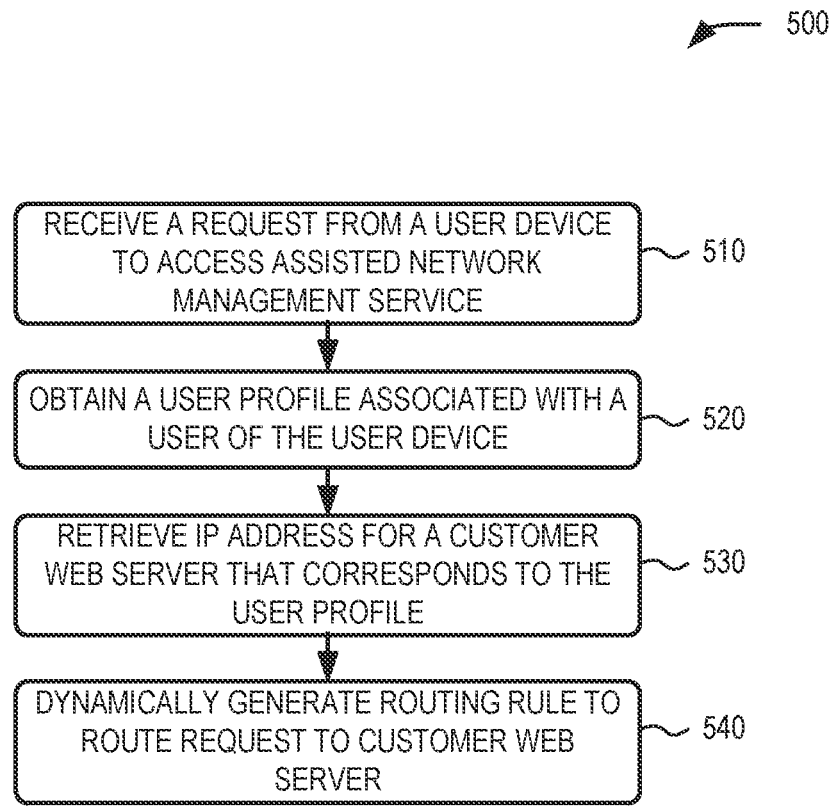
FIG. 5 is a flow diagram illustrating a process for providing profile-based routing and access control for a management interface of virtual network services with multiple tenants, according to an implementation.

FIG. 5 is a flow diagram illustrating an exemplary process 500 for providing profile-based routing and access control for a management interface of virtual network services with multiple tenants, according to an implementation described herein. In one implementation, process 500 may be implemented by RP/LB server 140. In another implementation, process 500 may be implemented by RP/LB server 140 in conjunction with one or more other devices in network portion 200.

Process 500 may include receiving a request from a user device to access a webpage for an assisted network management service (block 510). For example, using user device 180, an authenticated customer may provide user input to customer portal 150 to select an option for assisted network management services. Customer portal 150 may redirect the user device to RP/LB server 140, which may initiate a sign on federation process, if needed.

Process 500 may further include obtaining, in response to the request, a user profile associated with a user of the user device (block 520). For example, in response to the user webpage request (and any intervening sign on federation), RP/LB server 140 may retrieve a user profile from customer profile database 210. The user profile may identify an access level or particular services to which the user is subscribed/authorized.

Process 500 may also include retrieving an IP address for a customer web server, of multiple customer web servers for the assisted network management service, that corresponds to the user profile (block 530), and generating, based on the IP addresses, a routing rule to route the request to the customer web server (block 540). For example, RP/LB server 140 may access server address database 215 to retrieve IP addresses of all web servers (e.g., customer controllers 130) the user is authorized to access. Using the retrieved IP addresses, RP/LB server 140 may then dynamically generate one or more routing rules for the LB session with user device 180, as described further above in connection with FIGS. 2A-2C and 4.

Systems and methods describe herein combine application/user level access control with reverse proxy or load balancing feature in one component/process. Instead of statically-configured routing rules in a configuration file (e.g., server name or URL mapping to a IP address) and requiring customer-specific information directly passed in the request (e.g., a unique server name or URL path specific for the customer), the routing rule as described herein may be dynamically generated at the runtime based on the customer login session and customer profile. Thus, a user will not have the opportunity to manipulate the routing and will not be able to access any unauthorized network resource. Furthermore, the system and methods provide network level protection along with application/user level protection in one component (e.g. RP/LB server 140). Network traffic can be isolated for each customer, and no customer can access other customer's server or any network resource. The dynamically-generated routing rule for each customer can be cached in client side in encrypted format, similar to the way a login session is created/handled, as an optional solution to help improve routing performance and scalability while not compromising the security.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 4 and 5, and message/operation flows with respect to FIGS. 2A-2C, the order of the blocks and message/operation flows may be modified in other embodiments. Further, non-dependent blocks may be performed in parallel. Also, while the assisted network change service has been described primarily in the context of assisting changes for enterprise networks, in other implementations, the assisted network change service may be used for customers in other network environments, such customers utilizing MEC networks.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   receiving, at a network device and via a non-customer-specific link, a request from a user device to access a webpage for an assisted network management service, wherein the assisted network management service provides different customer web servers that each have a customer-specific management interface;

obtaining, by the network device in response to the request, a user profile from a profile database, wherein the user profile identifies an access level or services to which a user of the user device is authorized;

retrieving, by the network device and from a server address database, Internet Protocol (IP) addresses of multiple customer web servers for the assisted network management service, wherein each of the multiple customer web servers has a unique IP address and corresponds to the access level or services authorized for the user in the user profile;

generating, dynamically by the network device and based on the retrieved IP addresses, a routing rule to route the request to a customer web server of the multiple customer web servers, wherein a selection of the customer web server for the routing rule is based on a status of the multiple customer web servers and a load balancing configuration; and conducting, by the network device, a server side silent sign on to the customer web server that provides one of the customer-specific management interfaces.

2. The method of claim 1, wherein receiving the request from the user device further comprises:
receiving the request via a public network.

3. The method of claim 1, further comprising:
redirecting, by the network device, the user device to conduct sign on federation prior to obtaining the user profile.

4. The method of claim 1, wherein the assisted network management service permits the user to initiate policy changes to a hosted network.

5. The method of claim 1, wherein obtaining the user profile from the profile database includes associating the user with an access control class for the assisted network management service.

6. The method of claim 1, wherein retrieving the IP addresses includes retrieving the IP addresses from a data source that does not include the user profile.

7. The method of claim 1, further comprising:
caching, by the network device, the retrieved IP addresses of the customer web servers.

8. The method of claim 1, further comprising:
encrypting, by the network device, an IP address of the customer web server to form an encrypted IP address; and
providing the encrypted IP address to the user device.

9. The method of claim 1, wherein the receiving further comprises:
receiving the request via a common uniform resource locator (URL), and
wherein the method further comprises:
forwarding the request from the user device to an IP address of the customer web server, based on the routing rule.

10. A network device, comprising:
one or more processors configured to:
receive, via a non-customer-specific link, a request from a user device to access a webpage for an assisted network management service, wherein the assisted network management service provides different customer web servers that each have a customer-specific management interface;

obtain, in response to the request, a user profile from a profile database, wherein the user profile identifies an access level or services to which a user of the user device is authorized;

retrieve, from a server address database, Internet Protocol (IP) addresses of multiple customer web servers for the assisted network management service, wherein each of the multiple customer web servers has a unique IP address and corresponds to the access level or services authorized for the user in the user profile;

generate, dynamically based on the retrieved IP addresses, a routing rule to route the request to a customer web server of the multiple customer web servers, wherein a selection of the customer web server for the routing rule is based on a status of the multiple customer web servers and a load balancing configuration; and conduct a server side silent sign on to the customer web server that provides one of the customer-specific management interfaces.

11. The network device of claim 10, wherein, when receiving the request from the user device, the one or more processors are further configured to:
receive the request via a public network.

12. The network device of claim 10, wherein the one or more processors are further configured to:
redirect the user device to conduct sign on federation prior to obtaining the user profile.

13. The network device of claim 10, wherein the assisted network management service permits the user to initiate changes to a hosted network.

14. The network device of claim 10, wherein the user profile indicates a user's access control class for the assisted network management service.

15. The network device of claim 10, wherein, when retrieving the IP addresses, the one or more processors are further configured to:
retrieve the IP addresses from a data source that does not include the user profile.

16. The network device of claim 10, wherein the one or more processors are further configured to:
cache the retrieved IP addresses of the customer web server.

17. The network device of claim 10, wherein the one or more processors are further configured to:
encrypt an IP address of the customer web server to form an encrypted IP address; and
providing the encrypted IP address to the user device.

18. A non-transitory computer-readable medium containing instructions executable by at least one processor of a network device, the instructions to cause the at least one processor to:
receive, via a non-customer-specific link, a request from a user device to access a webpage for an assisted network management service, wherein the assisted network management service provides different customer web servers that each have a customer-specific management interface;

obtain, in response to the request, a user profile from a profile database, wherein the user profile identifies an access level or services to which a user of the user device is authorized;

retrieve, from a server address database, Internet Protocol (IP) addresses of multiple customer web servers for the assisted network management service, wherein each of the multiple customer web servers has a unique IP address and corresponds to the access level or services authorized for the user in the user profile;

generate, dynamically based on the retrieved IP addresses, a routing rule to route the request to a customer web server of the multiple customer web servers, wherein a selection of the customer web server for the routing rule is based on a status of the multiple customer web servers and a load balancing configuration; and conduct a server side silent sign on to the customer web server that provides one of the customer-specific management interfaces.

19. The non-transitory computer-readable medium of claim 18, further comprising instructions to cause the at least one processor to:

cache the retrieved IP addresses of the customer web server.

20. The non-transitory computer-readable medium of claim 18, further comprising instructions to cause the at least one processor to:

encrypt an IP address of the customer web server to form an encrypted IP address; and provide the encrypted IP address to the user device.

\* \* \* \* \*